Feb. 23, 1926.
R. HIRSCH
1,574,482
METHOD OF AND DEVICE FOR DRAWING TUBES
Filed April 17, 1925
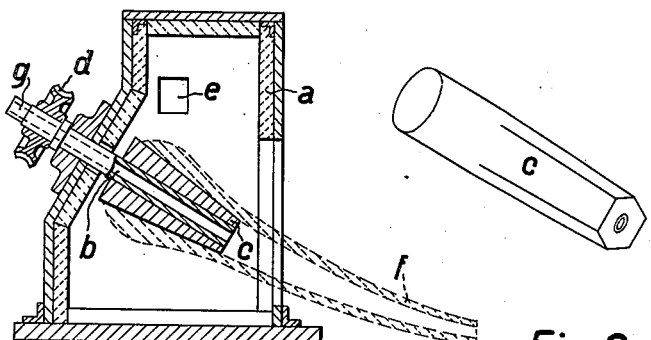
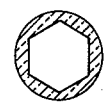
Fig. 1.
Fig. 2
Fig. 2a
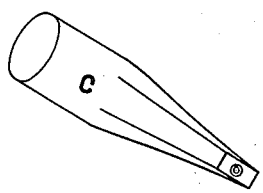
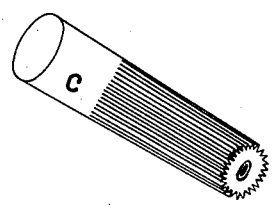
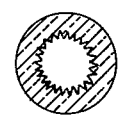
Fig. 3
Fig. 3a
Fig. 4
Fig. 4a
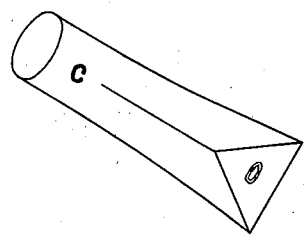
Fig. 5
Fig. 5a
Inventor:
Richard Hirsch Patented Feb. 23, 1926.

1,574,482

UNITED STATES PATENT OFFICE.

RICHARD HIRSCH, OF JENA, GERMANY, ASSIGNOR TO THE LIBBEY GLASS COMPANY, TRUST, OF TOLEDO, OHIO.

METHOD OF AND DEVICE FOR DRAWING TUBES.

Application filed April 17, 1925. Serial No. 23,931.

*To all whom it may concern:*

Be it known that I, RICHARD HIRSCH, a citizen of Germany, and residing at Jena, Germany, have invented a new and useful Method of and Device for Drawing Tubes, of which the following is a specification.

In accordance with a well-known method, glass tubes of circular cross section are made by conducting, on a body of circular cross section, which is disposed in an inclined position and rotatable, molten glass, and by drawing the latter off as a tube at the lower end of this body. According to the present invention, this method also admits of making tubes whose cross section deviates inside or outside, or inside and outside, in quite an optional manner from the circular shape, by making the aforesaid body deviate at its lower end from the circular shape.

If the aforesaid body be circular where it receives the glass and tapered towards its delivery end, one obtains a tube whose cross section corresponds inside to the shape of the delivery end of said body while outside it is circular, corresponding to the shape of the receiving end. On the other hand, if the body increases in size from its receiving portion to its delivery end, one obtains a tube whose cross section corresponds inside and outside to the shape of the delivery end. In other words, if the delivery end of the aforesaid body or mandrel is smaller than the receiving end, a tube may be produced having different shapes on the inside and outside, corresponding respectively to the delivery end and receiving end of the mandrel, whereas, if the delivery end is larger than the receiving end, both the inside and outside of the resultant tube is of substantially the same shape as the delivery end of the mandrel.

In a well-known manner, air may be allowed to enter the inside of the tube to be produced, or even be introduced under pressure in order to make sure that the tube will not close up to a rod. If, conversely, it be desired to obtain rods, the admission of air must be prevented, or at least not be facilitated.

In the accompanying drawings forming a part of this specification, Fig. 1 is a vertical longitudinal section of one form of apparatus embodying my invention; Figures 2, 3, 4 and 5 are perspective views of different forms of core bodies; Figs. $2^a$, $3^a$, $4^a$ and $5^a$ are cross-sections of tubes produced by the core bodies shown in Figures 2 to 5, respectively.

In the wall of a fire-proof bricked chamber $a$ (see Fig. 1) there is a rotatably disposed mandrel, comprising a downwardly inclined tube $b$, whose lower part is enclosed by a fire-proof core body $c$. By means of a worm wheel $d$ the tube can be slowly rotated. If through a lateral opening $e$ of the chamber glass be allowed to flow on the body $c$, whilst the same is rotating together with the tube $b$, there will be formed in a well-known way a glass tube $f$ which may be drawn off in any way in any desired length. If necessary, the extremity $g$ of the tube $b$ may be connected to a compressed air-pipe.

Fig. 2 shows in perspective a core body which is cylindrical in its upper part, whilst it is tapered in its lower part and assumes a hexagonal cross section. A cross-section of the tube resulting from the use of this body is shown in Fig. $2^a$, and is round outside and hexagonal inside.

Figs. 3 and $3^a$ show correspondingly a core body which is cylindrical in its upper part, whilst it is tapered in its lower part and assumes a rectangular cross section, and the resulting tube, which is round outside and rectangular inside.

The body shown in Fig. 4 is tapered and ribbed in its lower part, and produces the tube shown in Fig. $4^a$.

The core body shown in Fig. 5, increases in size in its lower part, which is triangular in cross section, produces the tube shown in Fig. $5^a$, which is trigonal both inside and outside.

It will be seen, from a comparison of the several forms of mandrel shown with the cross sections of the resultant tubes, that where the delivery end is smaller than the receiving end, as in Figs. 2, 3 and 4, the resultant tube is shaped inside like the delivery end of the mandrel from which it is drawn, while the outside retains the shape of the receiving end of the mandrel. On the other hand, where the delivery end of the mandrel is larger than the receiving end, as in Fig. 5, the resultant tube is shaped both inside and outside like the delivery end of the mandrel.

I claim:

1. A method which consists in forming a tubular mass of molten glass having its two ends of different shapes and sizes in cross section, continuously drawing a tube from smaller end of said mass, continuously adding to the other end of said mass, and maintaining the respective ends of said mass in substantially their original shapes and sizes in cross section.

2. A method in accordance with claim 1, in which the opening in the receiving end of said mass is maintained circular in cross section while the opening in the delivery end is maintained non-circular in cross section.

3. A method which consists in forming a tubular mass of glass having the opening circular in cross section at one end and non-circular in cross section at the other end, continuously drawing a tube from the end where said opening is non-circular in cross section, continuously adding to the other end of the mass, and maintaining the respective ends of the mass substantially in their original shapes in cross section.

4. Glass drawing apparatus comprising a mandrel adapted to receive molten glass on one end and to have the glass drawn from its other end, the delivery end of the mandrel being non-circular in cross section.

5. Glass drawing apparatus comprising a mandrel adapted to receive molten glass on one end and to have the glass drawn from its other end, the receiving end of the mandrel being circular in cross section, and the delivery end being of different shape in cross section.

6. A glass drawing apparatus comprising a mandrel adapted to receive molten glass on one end and to have the glass drawn from its other end, the two ends of the mandrel being of different shapes in cross section and the receiving end being larger than the delivery end.

RICHARD HIRSCH.